United States Patent
Newler (12)

(10) Patent No.: US 6,533,414 B2
(45) Date of Patent: Mar. 18, 2003

(54) EYEGLASS HOLDER CLIP

(76) Inventor: Barbara Newler, 512 Bloomfield Ave., Caldwell, NJ (US) 07006

( * ) Notice: Subject to any disclaimer, the term of this patent is extended or adjusted under 35 U.S.C. 154(b) by 0 days.

(21) Appl. No.: 10/098,850
(22) Filed: Mar. 14, 2002

(65) Prior Publication Data
US 2002/0131016 A1 Sep. 19, 2002

Related U.S. Application Data
(60) Provisional application No. 60/275,802, filed on Mar. 14, 2001.

(51) Int. Cl.[7] ............................... G02C 1/00; A47F 5/00
(52) U.S. Cl. ................. 351/158; 248/309.1; 248/316.7; 24/3.3; 224/251
(58) Field of Search ................................. 351/155, 158; 248/309.1, 315, 316.1, 316.7, 902; 24/3.1, 3.3; 211/13.1; 224/250, 251

(56) References Cited
U.S. PATENT DOCUMENTS 5,002,249 A * 3/1991 Meyer ..................... 248/316.7
5,699,140 A * 12/1997 Fuhrman .................... 351/158
5,842,613 A * 12/1998 White ......................... 224/250
5,860,191 A * 1/1999 Sieger ........................... 24/3.3
6,076,925 A * 6/2000 Kraut ......................... 351/112

* cited by examiner

Primary Examiner—Huy Mai
(74) Attorney, Agent, or Firm—Steven B. Stein, Esq.

(57) ABSTRACT

The present invention provides a A clip for holding eyeglasses, comprising (a) a base having top and bottom portions; (b) a tongue having a top part connected to the top portion of said base, said tongue extending downward to lie near said bottom portion of said base, said base and tongue being a one-piece member with said tongue in relaxed state lying in or close to the plane of said base, said tongue being resiliently bendable away from said plane of said base, said tongue having a bottom portion with a terminal edge, and upward from that edge an aperture; (c) a jump ring extending through said aperture in said tongue and situated generally perpendicular to said tongue; and (d) a holding ring interlinked with said jump ring and lying generally parallel to said plane of said base.

4 Claims, 5 Drawing Sheets

EYEGLASS HOLDER CLIP

The present application claims priority to Provisional Application, Serial No. 60/275,802, filed on Mar. 14, 2001, which is hereby incorporated by reference in its entirety.

FIELD OF THE INVENTION

The present invention relates to an attachable holder and more particularly to an eyeglass holder.

BACKGROUND OF THE INVENTION

An age-old nuisance afflicting vast numbers of people is misplacement of their eyeglasses and sunglasses, which they have removed from their faces for various reasons. Sunglasses are removed obviously when they are not needed, as when the sun is not glaring outdoors or when the person goes indoors. Eyeglasses such as reading glasses or distance glasses for driving are removed when not needed and more recently, with regard to computers, distance or reading eyeglasses may be removed and replace by intermediate distance glasses for viewing computer monitors. Presumably, most people do not have difficulty finding their glasses, which were removed for sleeping; however, it is so well known that during routine daily life, a great many people frequently and/or constantly misplace their glasses.

One unsatisfactory remedy is putting the glasses in a pocket, such as a pants pocket, which may lead to a bulging bad appearance, discomfort or even breakage. Another is to put the glasses in a shirt pocket, but this is bulky, and the glasses will often fall out and become lost or broken. A still other approach is to hang the glasses from a cord or chain around the person's neck which is unacceptable to many people. Consequently, many people simply put the glasses somewhere and forget where that place is.

The present invention provides distinct advantages over the prior art and solves numerous problems long described and understood in the field.

SUMMARY OF THE INVENTION

The present invention provides a novel approach that overcomes all the disadvantages of prior strategies. By this invention the eyeglasses, when removed from the face, are kept close to the person so they cannot become lost. More specifically, the eyeglasses are attached to the person's clothing by a new clip device, which may easily attach to a shirt collar, lapel or pocket, or to a belt or a shoulder strap, or to still other parts of clothing or accessories. The new clip is extremely functional in that it is simple, inexpensive, easy to use and efficiently holds and secures the eyeglasses, while allowing them to be instantly removable with no complications. The device utilizes the inherent configuration and weight distribution of most eyeglasses so that the hanging eyeglass frame automatically secures it from falling out of or away from the clip, even when the person moves or bends forward or sideways. Preferred embodiments of the invention are illustrated in the drawings appended hereto and described below.

It is therefore an object of this invention to provide The present invention provides a A clip for holding eyeglasses, comprising (a) a base having top and bottom portions; (b) a tongue having a top part connected to the top portion of said base, said tongue extending downward to lie near said bottom portion of said base, said base and tongue being a one-piece member with said tongue in relaxed state lying in or close to the plane of said base, said tongue being resiliently bendable away from said plane of said base, said tongue having a bottom portion with a terminal edge, and upward from that edge an aperture; (c) a jump ring extending through said aperture in said tongue and situated generally perpendicular to said tongue; and (d) a holding ring interlinked with said jump ring and lying generally parallel to said plane of said base.

DETAILED DESCRIPTION OF THE INVENTION

Figure 1:
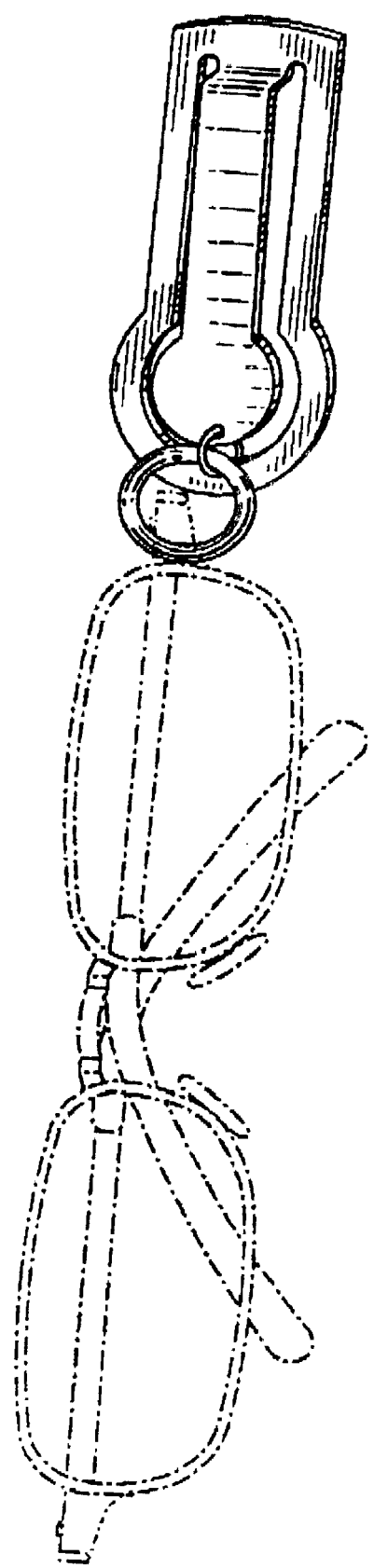
FIG. 1. is a front perspective view of a first embodiment of a clip of the new invention with a pair of eyeglasses coupled thereto.
Figure 2:
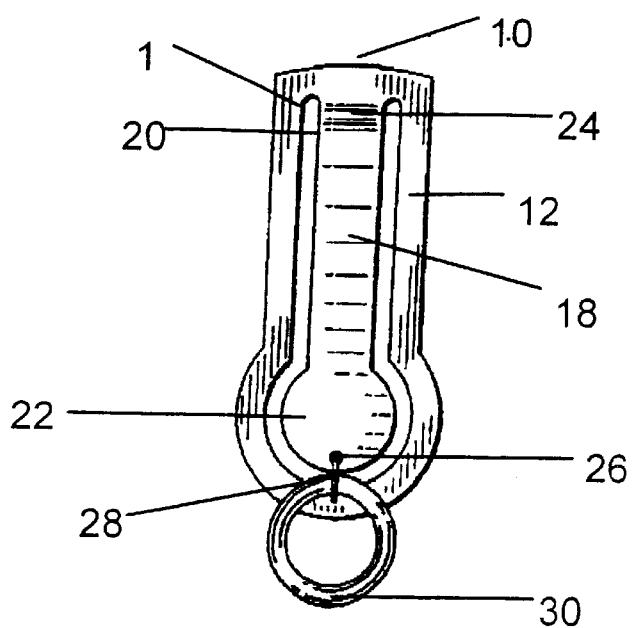
FIG. 2. is a front elevation view of the new clip.
Figure 3:
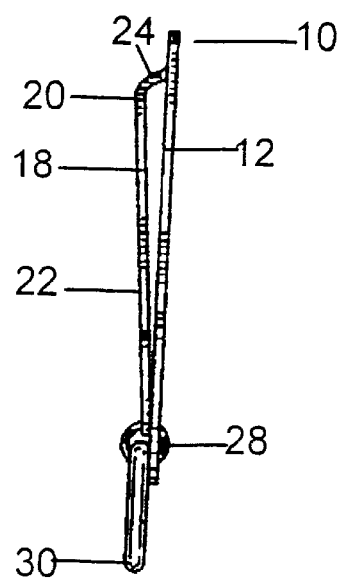
FIG. 3. is a left-side elevation view of the new clip of FIG. 2.
Figure 4:
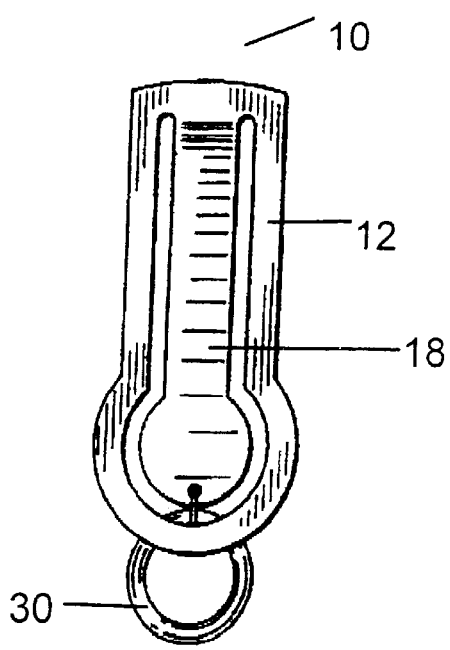
FIG. 4. is a rear elevation view of FIG. 2.
Figure 5:
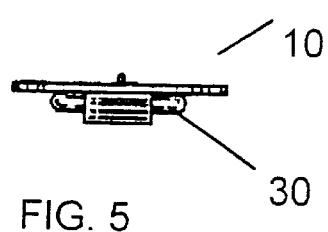
FIG. 5. is a top plan elevation view of FIG. 2.
Figure 6:
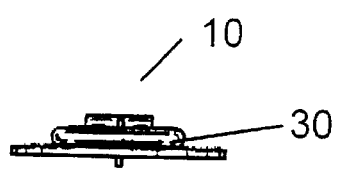
FIG. 6. is a bottom plan elevation view of FIG. 2
Figure 7:
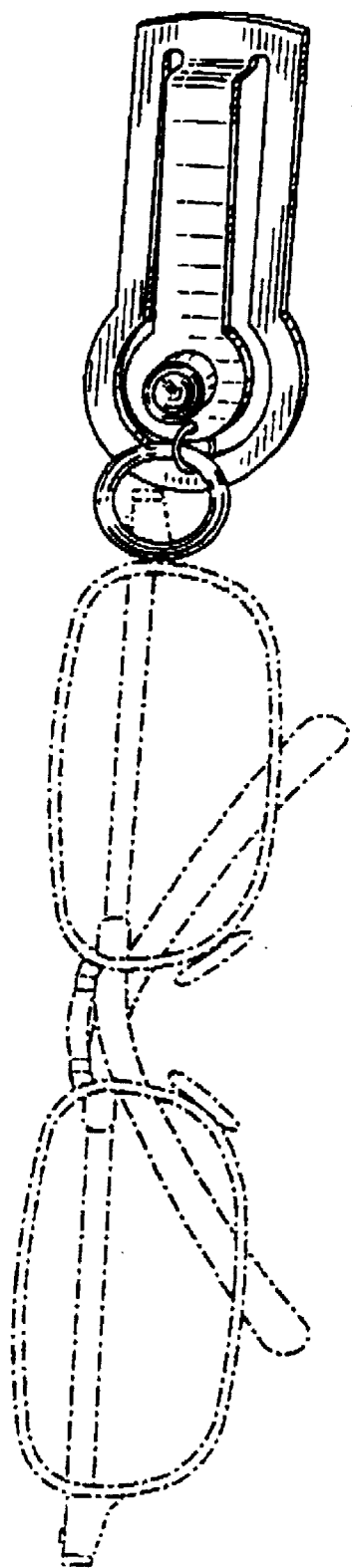
FIG. 7. is a front perspective view of the clip of FIG. 2 with an eyeglass coupled hereto.
Figure 8:
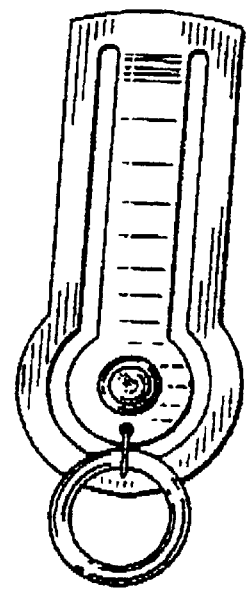
FIG. 8. is a front elevation view of a second embodiment of the new clip
Figure 9:
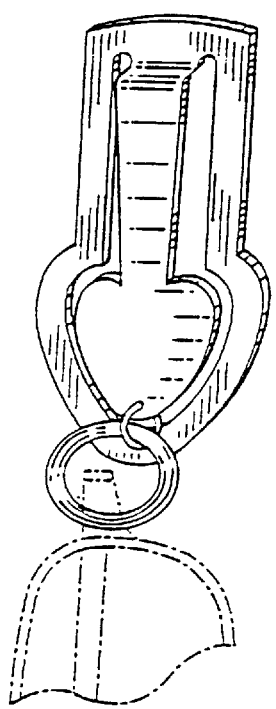
FIG. 9. is a front perspective view of a third embodiment.
Figure 10:
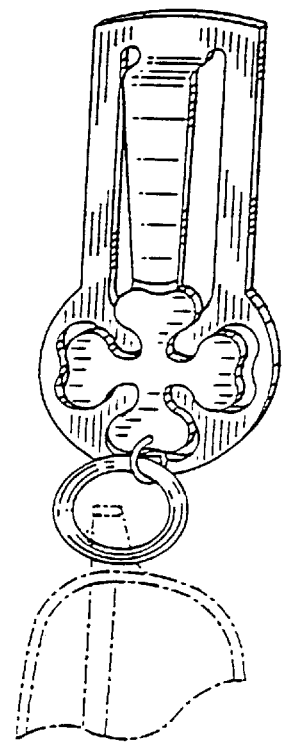
FIG. 10. is a front perspective view of a fourth embodiment.
Figure 11:
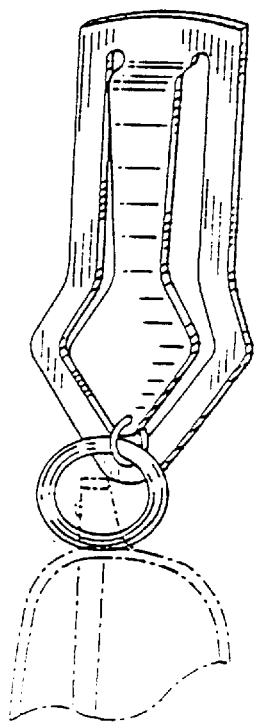
FIG. 11. is a front perspective view of a fifth embodiment.
Figure 12:
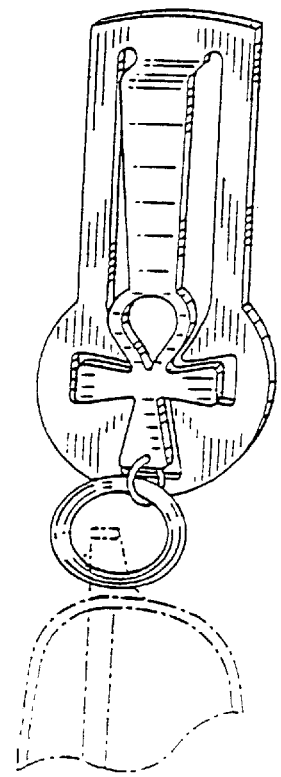
FIG. 12. is a front perspective view of a sixth embodiment.

The present invention provides a The present invention provides a A clip for holding eyeglasses, comprising (a) a base having top and bottom portions; (b) a tongue having a top part connected to the top portion of said base, said tongue extending downward to lie near said bottom portion of said base, said base and tongue being a one-piece member with said tongue in relaxed state lying in or close to the plane of said base, said tongue being resiliently bendable away from said plane of said base, said tongue having a bottom portion with a terminal edge, and upward from that edge an aperture; (c) a jump ring extending through said aperture in said tongue and situated generally perpendicular to said tongue; and (d) a holding ring interlinked with said jump ring and lying generally parallel to said plane of said base.

According to one embodiment of the invention, the jump ring and the aperture through which it extends have a relatively close fit such that said jump ring tends to remain generally perpendicular to said tongue. According to another embodiment, of the invention, the base and the tongue are formed from a single sheet of material. It is specifically contemplated that the material may comprise any resilient material such as metal, plastic or a synthetic compound. According to still another embodiment of this invention, the base is an elongated trip with an elongated generally U-shaped cut-out, and where the part inside the U-shape is aid tongue. It is specifically contemplated that other shaped cut-outs may be used.

Referring now to the figures. FIGS. 1–8 and 13 show the first embodiment 10 of the new eyeglass clip, with the eyeglasses shown in dotted line in FIG. 1 and in full line in FIG. 13 merely to show the application or environment for use of this device. This clip is formed of a base 12 having a top part 14 and bottom part 16 and a tongue 18, having top and bottom parts 20 and 22, and a resilient shoulder portion 24 connecting the upper part 20 of the tongue to the upper part 14 of the base.

Near the terminal edge 26 of the tongue is a hole 28A through which extends a jump ring 28, to which is linked a holding ring 30 which receives and holds the eyeglasses. Preferably, the fit of ring 28 in hole 28A is close such that ring 28 remains generally perpendicular to the plane of tongue 18. Consequently, ring 30 lies in a plane generally parallel to the plane of the base and the tongue, with the result that the eyeglasses 40 will tend to hang smoothly and securely against the person's shirt or other article of clothing, as seen in FIGS. 1 and 13.

The eyeglasses 40 comprise the frame 42, an upper shoulder. 42 which includes half of the hinge, a hinge pin or screw 44, and a temple or earpiece 46 having a proximal part 48 whose end forms the second half of the hinge, and a distal end 50 which engages the user's ear.

Figure 13:
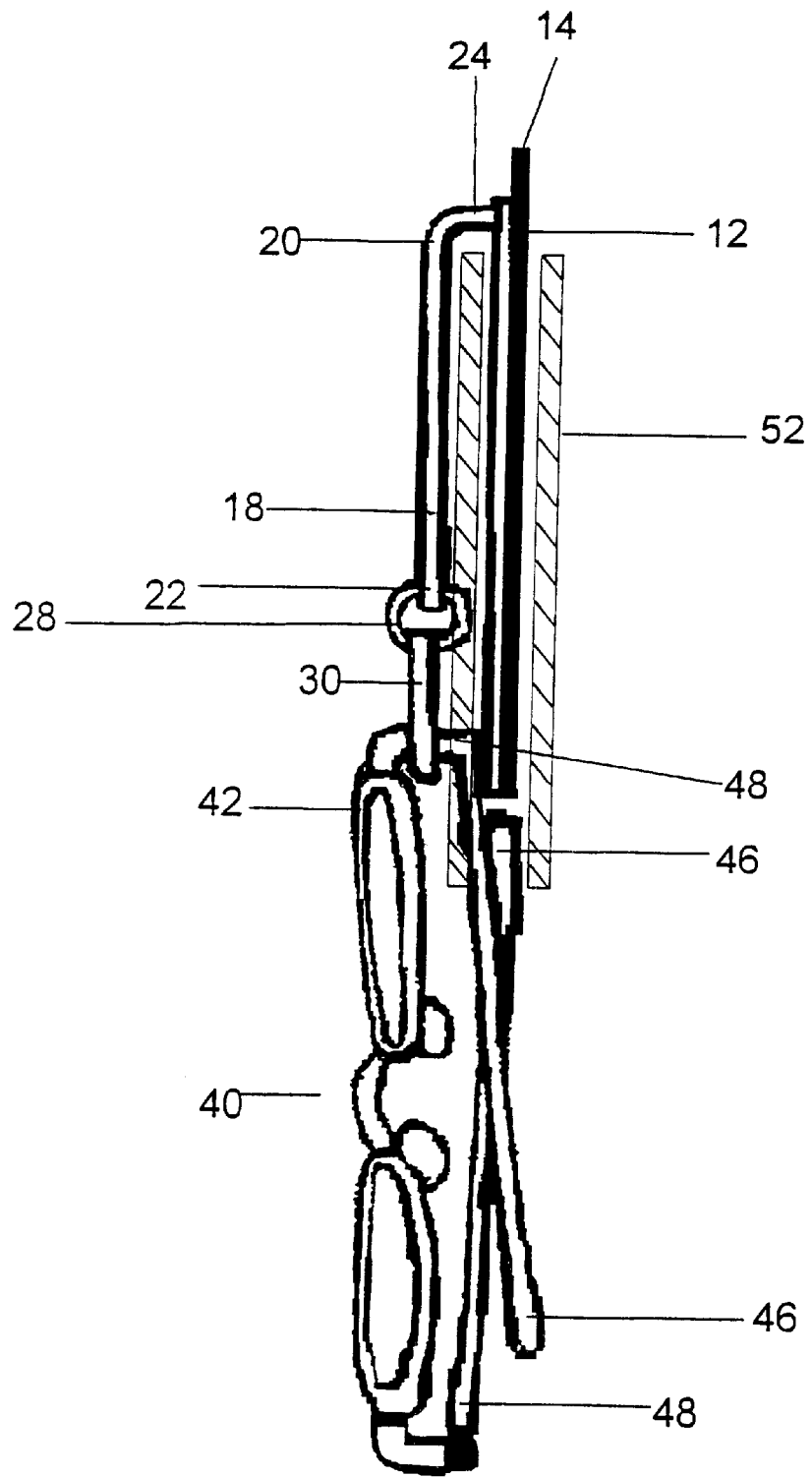
FIG. 13. is a left side elevation view of FIG. 1.

As seen in FIG. 13, the eyeglasses hang with its shoulder part 42 resting on ring 30, and its earpiece 46 folded and extending downward. The weight and configuration of the eyeglass frame causes it to hang in a plane generally parallel to the plane of the clip's base and to the plane of the person's pocket or other part of clothing. Since the eyeglass frame is hanging generally vertically, the only place for the earpiece to be is fully folded and pointing downward. In fact, the earpiece becomes captured between the frame 40 and the clothing 52, so that the eyeglasses are secured from separating in any direction from ring 30 to which it is coupled.

The clip 10 is releasably secured to the shirt pocket or collar or other item by virtue of the resilient clamping action of the tongue against the base with the fabric or other item trapped there between. FIGS. 7–12 show variations on the shape of the tongue and the mating portion of the base, with the same basic structure and operation as the device seen in FIGS. 1–7. These clips are made of common spring steel, brass, plastic or other appropriate resilient material, and the rings may be of metal, plastic or other appropriate material.

Throughout this application, various publications and patents and patent applications are referenced. The disclosures of these publications in their entireties are hereby incorporated by reference into this application in order to more fully describe the state of the art.

This invention may be embodied in other forms or carried out in other ways without departing from the spirit or essential characteristics thereof The present disclosure is therefore to be considered as in all respects illustrative and not restrictive, the scope of the invention being indicated by the appended Claims, and all changes which come within the meaning and range of equivalency are intended to be embraced therein.

I claim:

1. A clip for holding eyeglasses, comprising:

a. a base having top and bottom portions;

b. a tongue having a top part connected to the top portion of said base, said tongue extending downward to lie near said bottom portion of said base, said base and tongue being a one-piece member with said tongue in relaxed state lying in or close to the plane of said base, said tongue being resiliently bendable away from said plane of said base, said tongue having a bottom portion with a terminal edge, and upward from that edge an aperture;

c. a jump ring extending through said aperture in said tongue and situated generally perpendicular to said tongue; and d. a holding ring interlinked with said jump ring and lying generally parallel to said plane of said base.

2. A clip according to claim 1, wherein said jump ring and said aperture through which it extends have a relatively close fit such that said jump ring tends to remain generally perpendicular to said tongue.

3. A clip according to claim 1 wherein said base and tongue are formed from a single sheet.

4. A clip according to claim 3, wherein said base is an elongated strip with an elongated generally U-shaped cut-out, and where the part inside the U-shape is said tongue.

* * * * *